United States Patent [19]

Hunt

[11] Patent Number: 5,740,391
[45] Date of Patent: Apr. 14, 1998

[54] PREVENTING PREMATURE EARLY EXCEPTION SIGNALING WITH SPECIAL INSTRUCTION ENCODING

[75] Inventor: Douglas B. Hunt, Fort Collins, Colo.

[73] Assignee: Hewlett-Packard Co., Palo Alto, Calif.

[21] Appl. No.: 609,207

[22] Filed: Mar. 1, 1996

[51] Int. Cl.[6] ........................................ G06F 9/30
[52] U.S. Cl. ........................................ 395/376
[58] Field of Search ........................ 395/381, 389, 395/392, 580, 582, 583, 584, 376

[56] References Cited

U.S. PATENT DOCUMENTS

| | | | |
|---|---|---|---|
| 4,405,983 | 9/1983 | Perez-Mendez | 395/490 |
| 4,875,160 | 10/1989 | Brown, II | 395/569 |
| 5,056,091 | 10/1991 | Hunt | 395/182.08 |
| 5,109,514 | 4/1992 | Garner et al. | 395/125 |
| 5,150,469 | 9/1992 | Jouppi | 395/591 |
| 5,155,832 | 10/1992 | Hunt | 395/447 |
| 5,442,756 | 8/1995 | Grochowski et al. | 395/250 |
| 5,479,616 | 12/1995 | Garibay, Jr. et al. | 395/375 |
| 5,606,676 | 2/1997 | Grochowski et al. | 395/586 |

FOREIGN PATENT DOCUMENTS 2294341  4/1996  United Kingdom.

OTHER PUBLICATIONS

Popescu et al, "The Metaflow Architecture", 1991 IEEE.
Fite, "Designing a VAX for High Preformance", Dec., 1990 IEEE.
IEEE Computer Society Press Reprint of Doug Hunt — 1063–6390/95.

*Primary Examiner*—David Y. Eng

[57] ABSTRACT

A system and method for tracking early exceptions in a microprocessor system by inserting specially encoded exception messages into an instruction buffer when it is determined that a fetched instruction will generate an exception if executed. A retire unit removes executed instructions from the instruction buffer in program order, and, upon removal of an exception message, signals an appropriate exception.

19 Claims, 4 Drawing Sheets

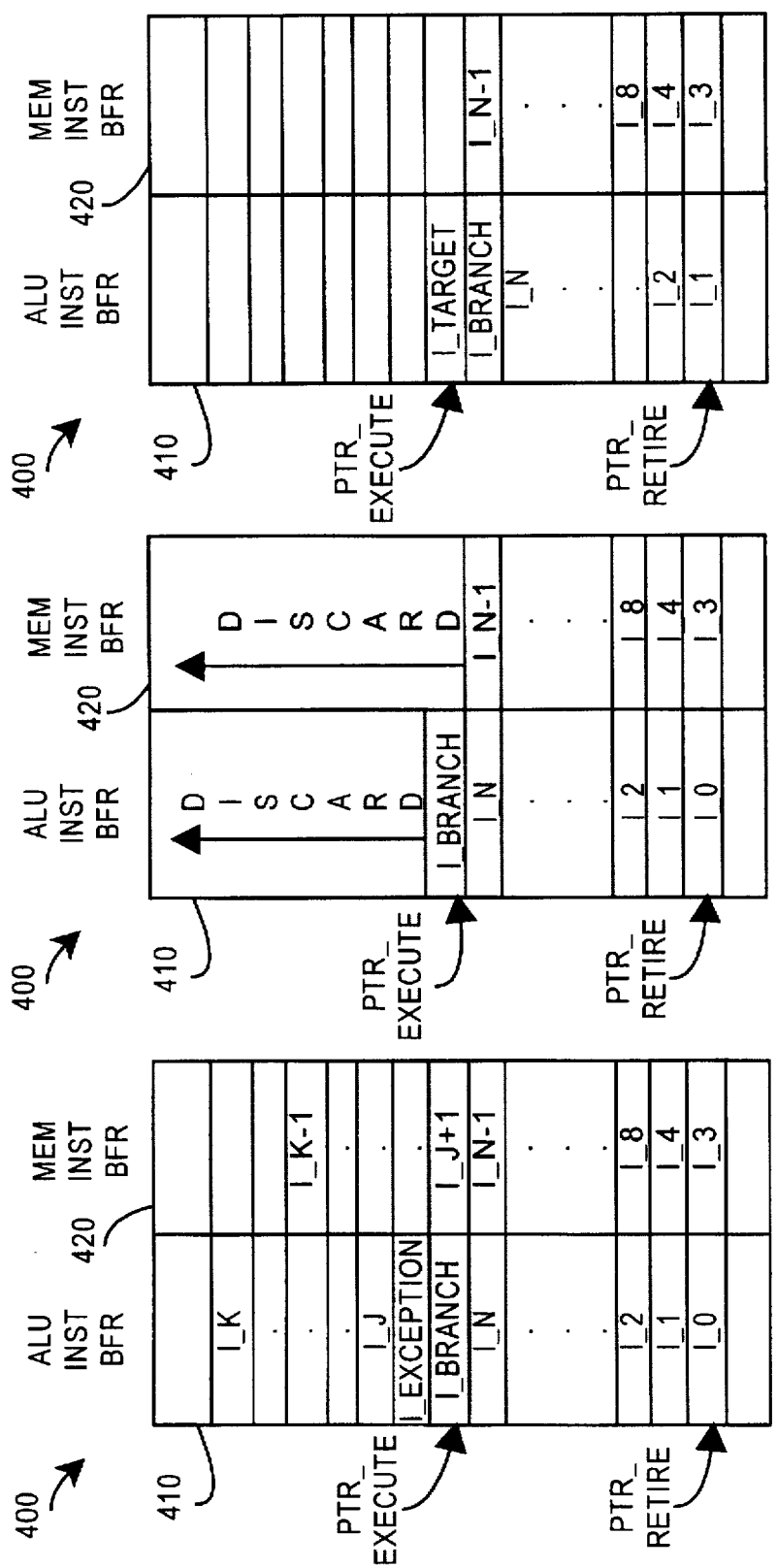

PREVENTING PREMATURE EARLY EXCEPTION SIGNALING WITH SPECIAL INSTRUCTION ENCODING

FIELD OF THE INVENTION

The present invention relates generally to microprocessor systems, and more particularly, to a system and method for preventing premature signaling of early exceptions by means of special instruction encodings.

BACKGROUND OF THE INVENTION

General purpose microprocessor systems are known in the art. Typically, microprocessors are structured on the Von Neumann model, wherein data and instructions are stored in a system memory which is addressable by location, and wherein a central processing unit (CPU) executes instructions in a sequential inline fashion.

Instructions are usually represented in the form of binary numbers. A single instruction generally includes at least an opcode, which is a binary representation of a particular instruction code. Depending on the particular instruction, it may also include one or more operands. Finally, most instructions include one or more control bits for keeping track of additional information required for processing.

Execution of an instruction typically consists of three stages:

1. An instruction fetch stage;
2. An operation stage; and
3. A memory access stage.

During the instruction fetch stage, an instruction is fetched from memory. In the operation stage, the instruction is decoded and any arithmetic operations (including address calculation) are performed. During the memory access stage, data is read from or written to system memory. Generally, different functional hardware units in the CPU carry out the operations of the three stages separately. Often, these functional units are referred to as the instruction fetch unit, the execution unit, and the memory management unit, respectively. Thus, execution of each instruction requires at least three clock cycles. Because each stage requires at least a full clock cycle to complete, most modern microprocessor systems utilize an instruction pipeline. Instruction pipelining is a known method in the art for allowing instruction execution to be overlapped.

Table 1, shown below, illustrates typical prior art operation of an instruction pipeline.

TABLE 1

| Cycle # | Instruction Fetch | Operation | Memory R/W |
|---|---|---|---|
| $T_0$ | $I_0$ | X | X |
| $T_1$ | $I_1$ | $I_0$ | X |
| $T_2$ | $I_2 = I_B$ | $I_1$ | $I_0$ |
| $T_3$ | $I_3$ | $I_2 = I_B$ | $I_1$ |
| $T_4$ | $I_{17}$ | X | $I_2 = I_B$ |

As shown in Table 1, the three instruction execution stages are partitioned into three separate functional units, each capable of performing a single operation during each clock cycle. Table 1 shows five execution cycles in which instruction $I_0$, $I_1$, $I_2$, $I_3$, and $I_{17}$ are started. As shown, instructions $I_0$ and $I_1$ cycle through each stage to completion. Thus, even though each instruction requires three clock cycles to complete, ideally one instruction should complete every clock cycle. Thus, with ALU instructions (e.g., ADD, SUB, AND, OR, etc.) and memory access instructions (e.g., LOAD, STORE), instruction pipelining operates to its full capacity. However, conditional program control instructions (e.g., BRE (branch if equal), BRG (branch if greater than), BRL (branch if less than), etc.) complicate the pipeline sequence.

Conditional program control instructions, also called conditional branch instructions, present an alternative in program flow which is dependent upon a realtime condition of program data. Thus, the direction of flow may be determined only in realtime when the condition becomes known. As a result, the instruction fetch unit must either wait until completion of the conditional branch instruction, thereby causing a "bubble" in the instruction pipeline, or it must predict the direction of flow at the risk of predicting incorrectly and thus causing a "bubble" in the instruction pipeline. The latter is one form of a method known as "speculative execution", which is well-known in the art.

More generally, speculative execution is said to occur any time the processing of an instruction is begun before it is known whether the instruction will actually complete. Speculative execution is used to optimize the execution of instructions to improve performance. In some systems, instructions are executed out of program order. In these systems, speculative execution may operate to execute younger instructions before the system knows whether an older instruction will successfully complete (i.e., cause an exception condition). If, upon execution, the older instruction causes an exception condition, all younger instructions are discarded from the instruction buffer. In other situations, speculative execution may occur by executing a load instruction before it is known whether an older unexecuted store instruction accesses the same location. If, upon execution, it turns out that the older instruction stored to the same location as the younger instruction loaded from, all instructions younger than the older store instruction are removed from the instruction buffer and their executed results discarded.

In another use of speculative execution, the instruction fetch unit "guesses" or predicts the outcome of a conditional branch instruction, and proceeds to fetch instructions before the condition becomes known from either the target address or the next inline program address according to the prediction. If, when the condition becomes known, it is determined that the prediction was incorrect, the incorrect instructions which have already been fetched are discarded and instruction fetching resumes from the correct address. For example, with reference to Table 1, instruction $I_2$ is a conditional branch instruction $I_B$. The instruction fetch unit predicts that the branch will not be taken, and instead fetches the next inline program instruction $I_3$ during cycle $T_3$. During realtime operation, the branch actually is taken, and the instruction fetch unit predicted incorrectly. Thus, the fetch of instruction $I_3$ is incorrect (i.e., $I_B$ is a "mispredicted branch"), resulting in a bubble in the pipeline sequence as shown in the execution stage of cycle $T_3$. Instruction $I_3$ is discarded and instruction fetching resumes at the correct address (i.e., the branch target address) with a fetch of instruction $I_{17}$.

Occasionally, during the course of fetching instructions which may or may not be executed, the instruction fetch unit encounters an instruction which will result in an exception condition if executed. An exception condition is typically a condition which causes a stall or bubble in the pipeline sequence and which may force the CPU to change the flow of program execution. The stall or bubble is typically communicated within the CPU by a number of signals denoting exception conditions. Generally, exception conditions cause an interrupt which is prioritized and handled by an interrupt handler. The interrupt handler may abort the execution of some pipestages, start executing new instructions at a system location, and change privilege operation modes as appropriate. Exceptions which occur during the first stage (i.e., the instruction fetch stage), are called early exceptions because they are detected early in the execution of the instruction. Typical exception conditions include memory protection violations, cache misses, instruction buffer misses, page faults, and translation lookaside buffer (TLB) misses.

As an example of an early exception, if the microprocessor attempts to execute instructions from protected memory, this fact can be detected by the instruction fetch unit in the first stage of execution. Detection of the memory protection violation occurs "early" in the instruction processing so that a memory violation is detected early, an exception signal is returned, and the offending instruction is aborted before it can be completed.

Another example of an early exception is a translation lookaside buffer miss. In systems having virtual memory, a high speed associative memory called a "translation lookaside buffer" (TLB) is often used to quickly translate virtual addresses into their physical memory address equivalents. As known in the art, the translation buffer caches the most recently used virtual-to-physical address translations. If a desired translation is not present in the translation buffer (i.e., a TLB "miss"), the translation process must halt, and so must the instruction which requested the faulting memory access. The desired translation is then read from a slower translation table in memory and the translation loaded into the TLB. If the translation in process is for an instruction fetch, the instruction fetch unit can detect the miss and signal an early exception.

As described above, the instruction fetch unit occasionally encounters an instruction which will result in an exception condition if executed. However, because the instruction fetch unit does not know whether the potential exception-generating instruction will be executed due to speculative execution, signalling an exception when the instruction is fetched is premature. Therefore, a means is needed for signalling to the execution unit which instruction causes an exception condition if executed and what type of exception it generates. One solution to this problem would be to add extra bits of storage associated with each instruction which would keep track of this information as the instructions are executed. However, this solution adds extra logic to the processor, increasing area and cost.

Thus, it is desirable to employ a method of tracking early exceptions which minimizes the additional logic required to track the exception, and which eliminates premature "false" signalling of exceptions.

SUMMARY OF THE INVENTION

In accordance with the preferred embodiment of the invention, there is presented a system and method for tracking early exceptions in a microprocessor system. The system generally includes an instruction fetch unit for fetching an instruction from program memory, inserting an exception message into an instruction buffer if it determines that the fetched instruction will result in an exception condition if executed, and inserting the fetched instruction into the instruction buffer if it determines that the fetched instruction will not result in an exception condition if executed. The system of the present invention also includes an execution unit for executing instructions contained in the instruction buffer. In addition, the system of the present invention includes an instruction retire unit for removing the instruction from the instruction buffer in program order after it has been processed by the execution unit, decoding the instruction, and signalling an exception if the instruction is an exception message.

The preferred embodiment of the present invention also includes a speculative execution means within the instruction fetch unit and an instruction buffer management unit within the execution unit. The speculative execution means detects a conditional branch instruction, predicts a target address of the conditional branch instruction, and fetches the next instruction according to the predicted target address. The instruction buffer management unit detects conditional branch instructions, monitoring their calculated target addresses upon execution, and compares the calculated target address to its predicted target address from the speculative execution means. When the calculated target address and the predicted target address do not match, the instruction buffer management unit removes all instructions from the instruction buffer which were inserted after the conditional branch instruction was inserted into the instruction buffer.

In the preferred embodiment of the present invention, the instruction buffer comprises a separate ALU instruction buffer and a separate memory access instruction buffer, and exception messages are inserted only in the ALU instruction buffer. This allows exception messages to be encoded using memory access instruction codes which the instruction retire unit recognizes as being exception messages if removed from the ALU instruction buffer.

The present invention also contemplates the use of unused instruction codes as exception messages. Preferably, a plurality of exception messages are implemented, wherein each exception message denotes a specific exception type.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings, of which:

FIG. 4A–4C is an internal view of an instruction buffer for illustrating the operation of an instruction buffer management unit which encounters a mispredicted branch instruction which would have generated an exception if executed.

DETAILED DESCRIPTION OF THE PRESENT INVENTION

Figure 1:
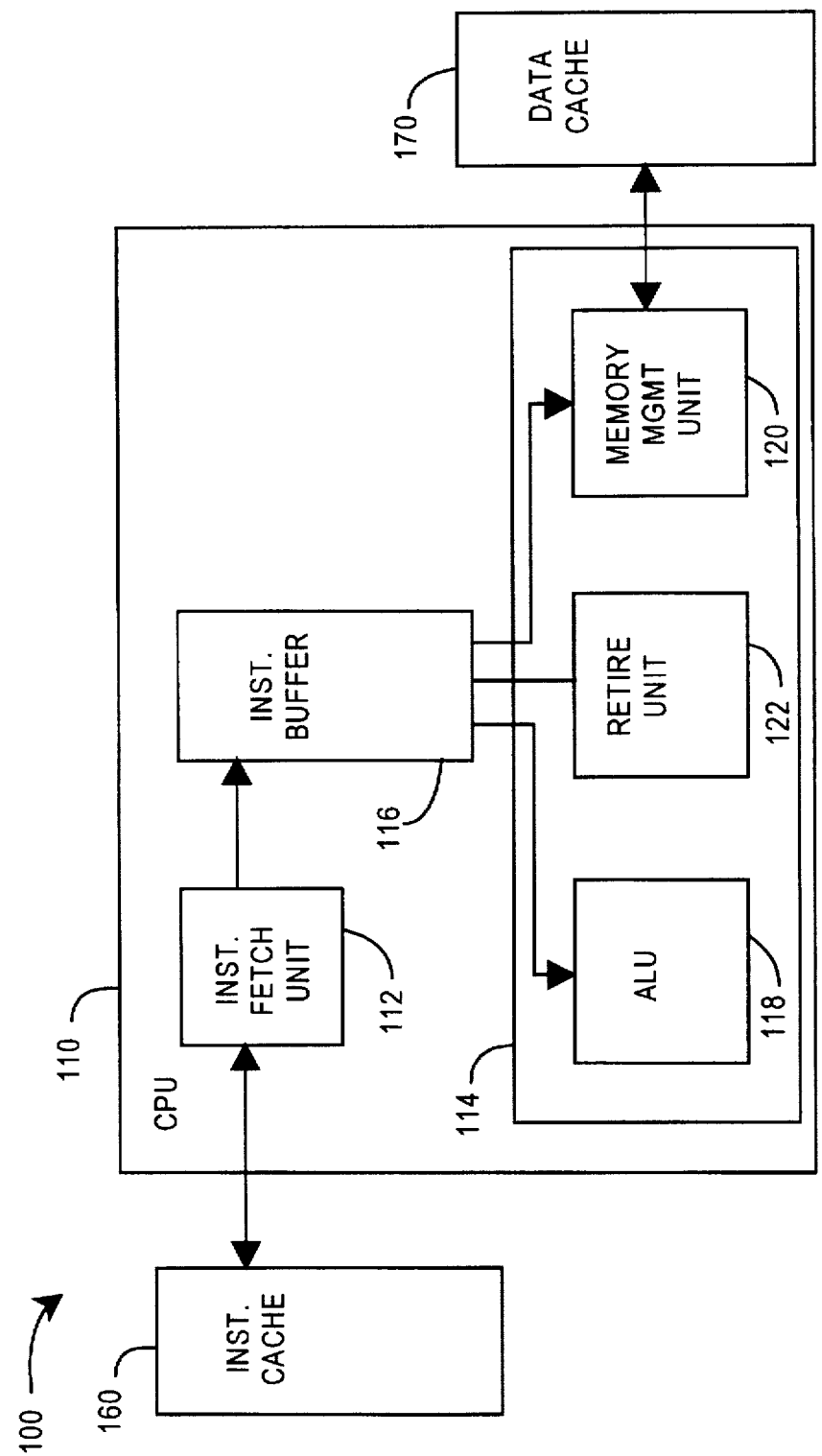
FIG. 1 is a block diagram of a microprocessor system in which the present invention operates.

FIG. 1 shows a block diagram of a portion of a computing system 100 in which the present invention operates. The computing system 100 includes a central processing unit (CPU) 110, an instruction cache 160, and a data cache 170. Typically, the instruction cache 160 and data cache 170 are implemented using high-speed SRAM separate from the CPU 110. The CPU 110 includes an instruction fetch unit 112, an instruction buffer 116, and an execution unit 114. The execution unit 114 includes an arithmetic logic unit 118, a memory management unit 120, and a retire unit 122.

In operation, the instruction fetch unit 112 fetches and decodes an instruction from the instruction cache 160. The instruction fetch unit 112 then determines whether execution of the decoded instruction will result in an exception condition. If the fetched instruction is a potential exception-generating instruction, the instruction fetch unit 112 inserts an exception message, preferably indicating the particular type of exception and preferably using an unused instruction code, into the instruction buffer 116. Otherwise, the instruction fetch unit 112 inserts the fetched instruction itself into the instruction buffer 116. The execution unit 114 executes the instructions contained in the instruction buffer 116. Arithmetic instructions are executed by the arithmetic logic unit 118 and memory instructions are executed by the memory management unit 120. The memory management unit 120 reads or writes memory in the data cache 170. The retire unit 122 removes executed instructions from the instruction buffer 116 in program order and generates an exception signal 124 if the instruction is a specially encoded exception message.

Figure 2:
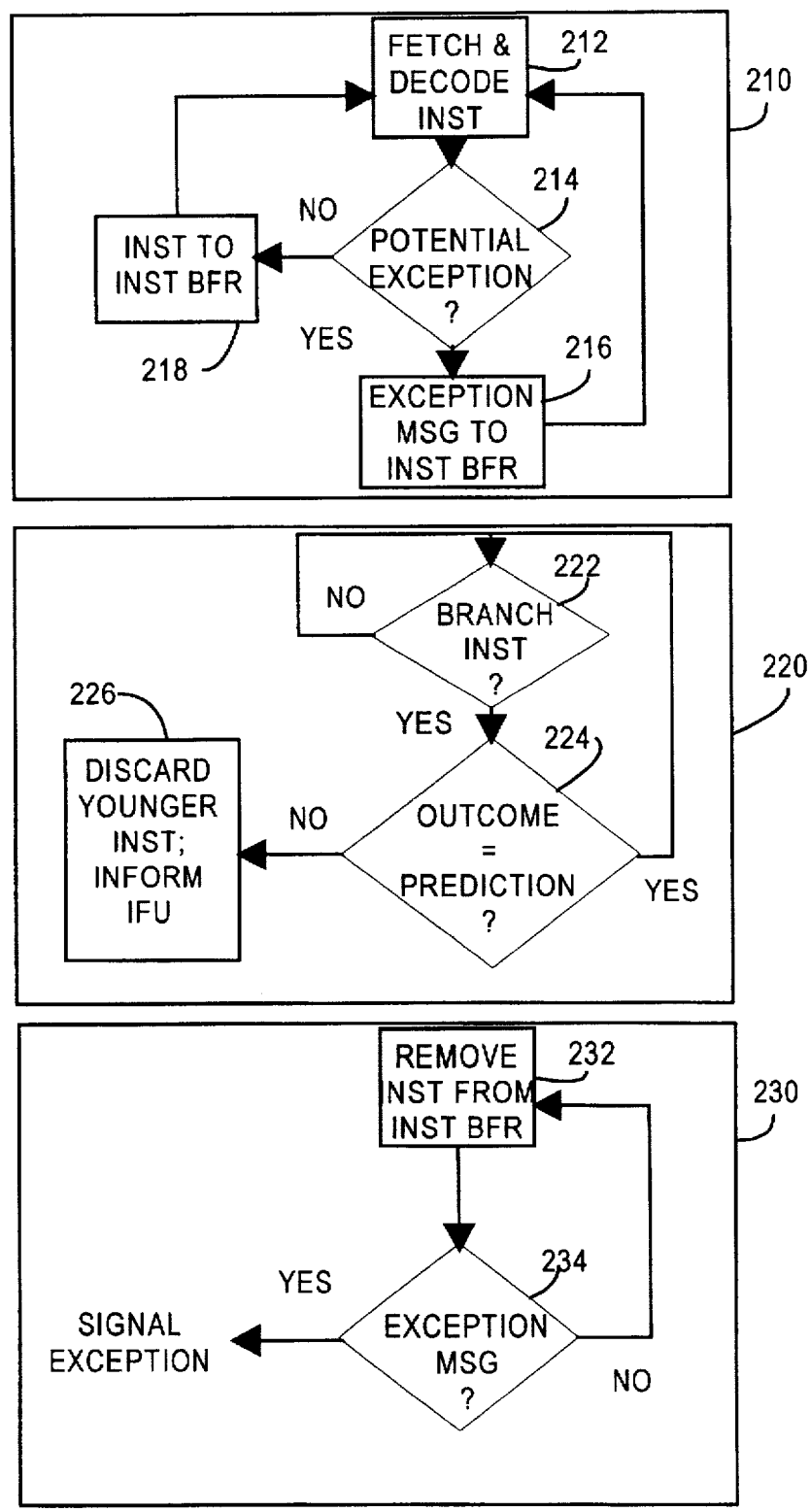
FIG. 2 is a flowchart illustrating the method of the present invention.

FIG. 2 is a flowchart illustrating a method 200 in accordance with the present invention. As shown in FIG. 2, the method 200 is partitioned into three separate processes 210, 220, 230. The first process 210 is performed in the instruction fetch unit 112, and includes a first step 212 of fetching and decoding an instruction from the instruction cache 160. The first process 210 includes a second step 214 of determining whether execution of the fetched instruction will result in an exception condition. If it is determined that execution of the instruction will generate an exception, the first process 210 performs a third step 216 of inserting an exception message into the instruction buffer 116. If, on the other hand, it is determined that execution of the instruction will not generate an exception condition, the instruction itself is inserted in the instruction buffer 116 in a fourth step 218. Preferably, the instruction message is encoded to indicate to the execution unit the particular type of exception that is generated by execution of the instruction. The instruction messages are implemented using unused instruction codes. This eliminates the need for additional bits in the instruction code for tracking early exceptions.

The method 200 of the present invention includes a second process 220 which is performed in the execution unit 114. The second process 220 keeps track of mispredicted branches and manages the instruction buffer 116 accordingly. The second process 220 includes a fifth step 222 of determining whether the instruction currently being executed is a conditional branch instruction. If the current instruction is a conditional branch instruction, the second process includes a sixth step 224 of determining whether the predicted branch matches the actual branch outcome. If the branch was mispredicted, the second process 220 includes a seventh step 226 of discarding all instructions in the instruction buffer 116 which were inserted after the mispredicted branch instruction was inserted in the instruction buffer 116. During the seventh step 226, the correct calculated address (either the branch target address or the inline program address) is sent to the instruction fetch unit 112, where instruction fetching is resumed from the correct address.

The method 200 of the present invention includes a third process 230 which is performed in the retire unit 122 for detecting and signalling exceptions. The third process 230 includes an eighth step 232 of removing a completed instruction from the instruction buffer 116. In a ninth step 234, the removed instruction is decoded and an exception is signalled if the removed instruction is an exception message.

From the above description of the method 200 shown in FIG. 2, it will be appreciated that the present invention overcomes the problem of premature exception signalling because an exception is signalled only when the exception-generating instruction is actually executed. If an instruction which would generate an exception if executed is fetched and inserted in the instruction buffer 116, but which will not actually be executed due to a mispredicted branch, the specially encoded exception message will be removed from the instruction buffer 116 by the execution unit before the exception message gets retired and an exception is detected and signalled by the retire unit 122. It will also be appreciated that the method 200 of the present invention requires no additional instruction bits or additional hardware to overcome the problem of premature exception signalling because the instruction messages are implemented using unused instruction codes.

Figure 3:
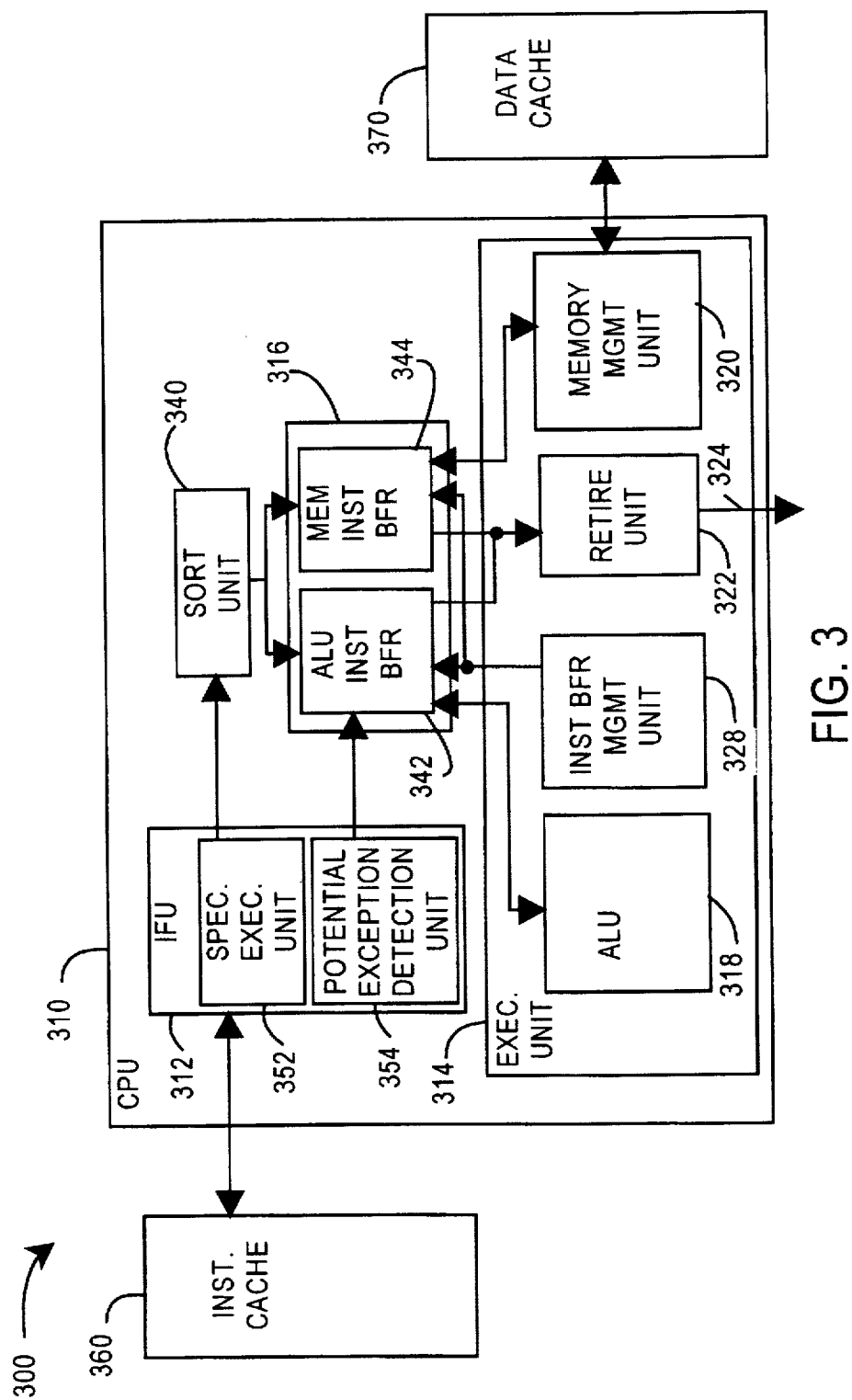
FIG. 3 is a block diagram of a preferred embodiment microprocessor system in which the present invention operates.

FIG. 3 depicts a preferred embodiment of a system 300 in accordance with the present invention. As shown in FIG. 3, the preferred embodiment system 300 includes a central processing unit (CPU) 310, an off-chip instruction cache 360, and an off-chip data cache 370. In the preferred embodiment system 300, the instruction cache 360 and data cache 370 are implemented using high-speed static RAM chips separate from the CPU 310. The CPU 310 includes an instruction fetch unit 312, an instruction sort unit 340, an instruction reorder buffer (IRB) 316, and an execution unit 314. The instruction fetch unit 312 includes a speculative execution unit 352 and a potential exception detection unit 354. The execution unit 314 includes an arithmetic logic unit (ALU) 318, a memory management unit (MMU) 320, an instruction reorder buffer (IRB) management unit 328, and a retire unit 322. As also shown in FIG. 3, the instruction reorder buffer 316 is separated into two separate buffers, including an ALU instruction buffer 342 and a memory access instruction buffer 344.

In operation, the instruction fetch unit 322 fetches an instruction from the instruction cache 360. The speculative execution unit 352 decodes the instruction to determine whether it is a conditional branch instruction. If the instruction is a conditional branch instruction, the speculative execution unit 352 predicts whether the branch will be taken and accordingly updates the address of the next instruction to fetch.

The potential exception detection unit 354 determines whether the fetched instruction will generate an exception condition if it is executed. If the fetched instruction is a potential exception-generating instruction, a specially encoded exception message is inserted in the ALU instruction buffer 342. Otherwise, where the fetched instruction is not a potential exception-generating instruction, the fetched instruction itself is sent to the sort unit 340.

The sort unit 340 receives instructions from the instruction fetch unit 312 and sorts the instructions between the ALU instruction buffer 342 and the memory access instruction buffer 344. Generally, instructions requiring ALU operations, such as integer and floating point arithmetic operations, are inserted in the ALU instruction buffer 342, and instructions requiring load and store operations are inserted in the memory access instruction buffer 344. The retire unit 324 removes each instruction from the ALU instruction buffer 342 and the memory access buffer 344 after it is executed and in program order.

In the preferred embodiment system 300 of FIG. 3, the specially encoded exception messages are implemented using load and store instruction codes which would never be sorted into the ALU instruction buffer 342 by the instruction sort unit 340. In addition, in the preferred embodiment system 300, a load/store instruction removed from the ALU instruction buffer 342 is recognized by the retire unit 322 as an exception code and is decoded to signal the appropriate exception signal 324. Using the architecture of the preferred embodiment system 300 shown in FIG. 3, and in particular by separating the instruction buffer 316 into specialized instruction buffers (i.e., the ALU instruction buffer 342 and the memory access instruction buffer 344), instructions codes may have duplicate functions by having two separate meanings under different conditions. This feature maximizes the amount of information provided by a single instruction code and also allows the present invention to be used in systems which have no unused instruction codes.

The system 300 of FIG. 3 also includes an instruction buffer management unit 328. The instruction buffer management unit 328 monitors the outcome of conditional branch instructions when they are executed and compares the outcome with the prediction. If the outcome does not match the prediction, the instruction buffer management unit 328 removes all instructions from the instruction buffer 316 which were entered after the conditional branch instruction was entered, and sends the correct address calculated upon execution of the conditional branch instruction to the instruction fetch unit 312 to resume fetching from the correct address.

FIGS. 4(a)–(c) shows an instruction buffer 400 with sample instructions to illustrate the operation of the instruction buffer management unit 328 of FIG. 3 when it encounters a mispredicted branch instruction which would have generated an exception condition if executed. In the preferred embodiment system 300 of FIG. 3, the instruction buffer 316 is reordered by the hardware to maximize pipeline efficiency such that instructions which are not waiting for a result from prior instructions are launched for execution first. The method of arbitrating for launching and method for launching instructions for execution may be implemented using any workable scheme, so long as the retire unit 322 removes the instructions from the instruction buffer 316 in program order. In other words, the present invention may be used in a microprocessor system which does or does not perform instruction reordering, but the retire unit 322 must remove instructions from the instruction buffer 316 in program order. Thus, for ease of illustrating the operation of the instruction buffer management unit 328, the instruction buffer 400 in FIG. 4 assumes a first-in-first-out (FIFO) scheme where instruction reordering is not performed.

Thus, with reference to FIG. 4, instructions $I_0, I_1, \ldots, I_{N-1}, I_N$ were inserted into the instruction buffer 400 in numerical subscript order. In other words, $I_0$ was the first instruction inserted in the instruction buffer 400 and will be the first instruction removed from the instruction buffer 400; $I_1$ was the second instruction inserted in the instruction buffer 400 and will be the second instruction removed from the instruction buffer; and so on. As shown in FIG. 4, the instructions are sorted between an ALU instruction buffer 410 and a memory access buffer 420. However, instructions are still retied in a FIFO manner such that $I_3$ is retired after $I_2$ and $I_8$ is retired directly after $I_7$, and so on, under normal program sequence. As also shown in FIG. 4, the instruction buffer 400 contains a mispredicted branch instruction $I_{BRANCH}$ followed by instructions from the wrong target address, including instruction $I_{EXCEPTION}$, followed by instructions $I_J, \ldots, I_K$ in predicted program order. The instruction $I_{EXCEPTION}$ will generate an exception if executed and is a specially encoded exception message inserted by the potential exception detection unit 354 of FIG. 3.

At the point of time shown in FIG. 4(a), instruction $I_0$ is the next instruction in line to be retired, as indicated by the retire pointer $PTR_{RETIRE}$, and the conditional branch instruction $I_{BRANCH}$ is next in line to be executed, as indicated by the execution pointer $PTR_{EXECUTION}$. Then, when the conditional branch instruction $I_{BRANCH}$ is executed, the execution unit calculates an actual target address outcome different from the mispredicted branch instruction $I_{EXCEPTION}$. The instruction buffer management unit 328 of FIG. 3 then removes all instructions in the instruction buffer 400 which were inserted after the instruction $I_{BRANCH}$ was inserted, as shown in FIG. 4(b). The correct branch address calculated by the execution unit 314 of FIG. 3 is then sent to the instruction fetch unit 312 of FIG. 3, and fetching resumes at the correct branch address with instruction $I_{TARGET}$, as shown in FIG. 4(c). As also seen in FIG. 4(c), instruction I0 has been retired (i.e., removed from the instruction buffer 400) and instruction I1 is next in line for retirement, as indicated by the retire pointer $PTR_{RETIRE}$.

FIGS. 4(a)–(c) illustrate how the present invention prevents premature exception signalling. In FIG. 4(a), a potential exception-generating instruction $I_{EXCEPTION}$ was inserted in the instruction buffer 400 due to a mispredicted branch. Therefore, instruction $I_{EXCEPTION}$ would never have been executed. When the mispredicted branch was discovered upon execution of the conditional branch instruction $I_{BRANCH}$, all instructions fetched according to the prediction (i.e., $I_{EXCEPTION}, I_J, \ldots, I_K$) were removed from the instruction buffer 400 and discarded, as shown in FIG. 4(b). Thus, it will be appreciated that the present invention provides an efficient system and method for avoiding premature exception signalling. If an exception-generating instruction actually gets executed, its specially encoded exception message is retired in program order in the same manner as regular instructions, and is thus detected and signalled in program order.

A contemplated use for the present invention is to implement a mechanism to control the caching of instructions. Specifically, it is advantageous for a microprocessor to be disallowed from moving instructions into the cache unless some instruction on that page is actually executed. After that point, it is acceptable to move an instruction from that page into the cache. Using the present invention, this may be accomplished as follows: The instruction fetch unit 312 of FIG. 3 inserts an exception message into the ALU instruction buffer 342 when it "guesses" that a page crossing will be required. If the execution unit 314 determines that the program sequence actually will cross the page, an exception is signalled, causing a signal to indicate to the instruction fetch unit that it may proceed to move instructions from that page into the cache.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A computing system for preventing premature signaling of early exceptions, said system comprising:
    an instruction fetch unit for fetching an instruction from an instruction cache, said instruction fetch unit comprising:
        early exception detection means for determining whether execution of said instruction will result in an early exception condition if executed; and
        insertion means for inserting an instruction code encoded as an early exception message into an instruction buffer if said early exception detection means determines that said instruction will result in an early exception condition if executed and for inserting an instruction code encoded as said instruction into said instruction buffer if said early exception detection means determines that said instruction will not result in an early exception condition if executed;

an execution unit for executing said instruction code if said instruction code is encoded as said instruction; and an instruction retire unit comprising:
   instruction removal means for removing said instruction code from said instruction buffer in program order;
   decoding means for decoding said instruction code; and
   early exception signaling means for signalling an early exception if said instruction code is an encoded early exception message.

2. The system of claim 1, further comprising:

a speculative execution unit comprising:
   means for detecting when said instruction fetched from said instruction cache by said instruction fetch unit is a conditional branch instruction;
   means for predicting a target address of said conditional branch instruction; and
   means for causing a next instruction fetched by said instruction fetch unit to be fetched according to said predicted target address; and an instruction buffer management unit comprising:
   means for detecting an instruction code in said instruction buffer encoded as said conditional branch instruction;
   means for monitoring an actual target address of said conditional branch instruction when said instruction code encoded as said conditional branch instruction is executed by said execution unit;
   means for comparing said actual target address to said predicted target address; and
   means for removing all instruction codes from said instruction buffer which were inserted after said instruction code encoded as said conditional branch instruction was inserted into said instruction buffer.

3. The system of claim 1, said instruction code encoded as an early exception message denotes a specific exception type.

4. The system of claim 1, said instruction code encoded as an early exception message comprising an unused instruction code.

5. The system of claim 1, said instruction buffer comprising:
   a plurality of specialized instruction buffers, each specialized instruction buffer storing instruction codes of a specialized instruction type.

6. The system of claim 5, wherein said insertion means inserts said instruction code encoded as an early exception message into a pre-determined one of said specialized instruction buffers.

7. The system of claim 6, wherein: said instruction code encoded as an early exception message is not a member of said specialized instruction type of said instruction codes stored in said pre-determined one of said specialized instruction buffers; and
   said instruction retire unit comprises means for detecting that said instruction code encoded as an early exception message is not a member of said specialized instruction type and for interpreting said instruction code as said early exception message.

8. A computing system for complying with instruction cache move-in rules which allow instructions from a given page in program memory to be moved into an instruction cache only if at least one instruction on said given page will be executed, said system comprising:

an instruction fetch unit for fetching an instruction, said instruction being fetched from either said instruction cache or said program memory, said instruction fetch unit comprising:
   program memory fetching means for fetching said instruction from said program memory when said next instruction does not reside in said instruction cache;

early page-crossing exception detection means for determining whether said instruction resides on a non-resident page, said non-resident page comprising a page in program memory from which no instructions have yet been executed; and insertion means for inserting an instruction code encoded as a move-in exception message into an instruction buffer if said early page-crossing detection means determines that said instruction resides on a page from which no instructions have yet been executed;

an execution unit for executing instructions codes contained in said instruction buffer which are encoded as executable instructions; and an instruction retire unit comprising:
   instruction removal means for removing an instruction code from in said instruction buffer in program order; and
   early page-crossing exception signaling means for signalling the instruction fetch unit to move instructions from said given page into said instruction cache if said instruction code is encoded as said move-in exception message.

9. The system of claim 8, further comprising:

a speculative execution unit comprising:
   means for detecting when said instruction is a conditional branch instruction;
   means for predicting a target address of said conditional branch instruction; and
   means for causing a next instruction fetched by said instruction fetch unit to be fetched according to said predicted target address; and an instruction buffer management unit comprising:
   means for detecting an instruction code in said instruction buffer encoded as said conditional branch instruction;
   means for monitoring an actual target address of said conditional branch instruction when said instruction code encoded as said conditional branch instruction is executed by said execution unit;
   means for comparing said actual target address to said predicted target address; and
   means for removing all instruction codes from said instruction buffer which were inserted after said instruction code encoded as said conditional branch instruction was inserted into said instruction buffer.

10. The system of claim 8, said instruction code encoded as an early exception message comprising an unused instruction code.

11. The system of claim 8, said instruction buffer comprising:
   a plurality of specialized instruction buffers, each specialized instruction buffer storing instruction codes of a specialized instruction type.

12. The system of claim 11, wherein said insertion means inserts said instruction code encoded as an early exception message into a pre-determined one of said specialized instruction buffers.

13. The system of claim 12, wherein: said instruction code encoded as an early exception message as not a member of said specialized instruction type of said instruction codes stored in said pre-determined one of said specialized instruction buffers; and said instruction retire unit comprises means for detecting that said instruction code encoded as an early exception message is not a member of said specialized instruction type and for interpreting said instruction code as said early exception message.

14. A method for preventing premature signaling of early exceptions in a microprocessor system, comprising two concurrently running processes, wherein:

the first process comprises the steps of:
(a) fetching an instruction from an instruction cache;
(b) determining whether execution of the fetched instruction will result in an exception condition;
(c) inserting an instruction code comprising an encoded exception message into an instruction buffer if execution of the fetched instruction will result in an exception condition; and
(d) inserting an instruction code comprising the fetched instruction into the instruction buffer if execution of the fetched instruction will not result in an exception condition; and the second process comprises the steps of:
(e) removing in program order an executed instruction code from the instruction buffer;
(f) detecting an instruction code comprising an encoded exception message, and signalling an appropriate exception signal when an instruction code comprising an encoded exception message is detected.

15. The method of claim 14, wherein the first process further comprises the steps of:
(g) detecting when said fetched instruction is a conditional branch instruction;
(h) predicting a target address of said conditional branch instruction; and
(i) causing a next instruction fetched by said instruction fetch unit to be fetched according to said predicted target address; and the method further comprising a third concurrently running process, comprising the steps of:
(j) detecting an instruction code in said instruction buffer encoded as said conditional branch instruction;
(k) monitoring an actual target address of said conditional branch instruction when said instruction code encoded as said conditional branch instruction is executed by said execution unit;
(l) comparing said actual target address to said predicted target address; and
(m) removing all instruction codes from said instruction buffer which were inserted after said instruction code encoded as said conditional branch instruction was inserted into said instruction buffer.

16. The method of claim 14, said instruction code encoded as an early exception message comprising an unused instruction code.

17. The method of claim 14, said instruction buffer comprising:

a plurality of specialized instruction buffers, each specialized instruction buffer storing instruction codes of a specialized instruction type.

18. The method of claim 17, wherein said insertion means inserts said instruction code encoded as an early exception message into a pre-determined one of said specialized instruction buffers.

19. The method of claim 18, wherein: said instruction code encoded as an early exception message is not a member of said specialized instruction type of said instruction codes stored in said pre-determined one of said specialized instruction buffers; and said instruction retire unit comprises means for detecting that said instruction code encoded as an early exception message is not a member of said specialized instruction type and for interpreting said instruction code as said early exception message.

* * * * *

UNITED STATES PATENT AND TRADEMARK OFFICE
CERTIFICATE OF CORRECTION

PATENT NO. : 5,740,391
DATED : April 14, 1998
INVENTOR(S) : Douglas B. Hunt

It is certified that error appears in the above-identified patent and that said Letters Patent is hereby corrected as shown below:

Column 3, Line 58: "tracking" should be --preventing premature signaling of--

Column 10, Line 32-33: "signalling" should be --signaling-- (Applicant's error)

Signed and Sealed this

Fifteenth Day of May, 2001

Attest:

NICHOLAS P. GODICI

Attesting Officer  Acting Director of the United States Patent and Trademark Office